United States Patent
Jokinen

(10) Patent No.: US 8,841,801 B2
(45) Date of Patent: Sep. 23, 2014

(54) LIMITATION OF THE LOADING OF A POWER SOURCE

(75) Inventor: Risto Jokinen, Hyvinkää (FI)

(73) Assignee: KONE Corporation, Helsinki (FI)

( * ) Notice: Subject to any disclaimer, the term of this patent is extended or adjusted under 35 U.S.C. 154(b) by 550 days.

(21) Appl. No.: 12/783,411

(22) Filed: May 19, 2010

(65) Prior Publication Data

US 2010/0224452 A1 Sep. 9, 2010

Related U.S. Application Data

(63) Continuation of application No. PCT/FI2008/000127, filed on Nov. 19, 2008.

(30) Foreign Application Priority Data

Nov. 20, 2007 (FI) .................................. 20070882

(51) Int. Cl.
*G01R 1/20* (2006.01)
*G05F 5/00* (2006.01)

(52) U.S. Cl.
CPC ........................................ *G05F 5/00* (2013.01)
USPC ................. 307/154; 263/34; 263/35; 263/38; 263/135; 263/138

(58) Field of Classification Search
CPC ................................................ G05F 5/00
USPC .......................................... 307/154; 187/290
See application file for complete search history.

(56) References Cited

U.S. PATENT DOCUMENTS

| | | |
|---|---|---|
| 5,229,558 A | 7/1993 | Hakala |
| 5,861,734 A | 1/1999 | Fasullo et al. |
| 6,269,010 B1 * | 7/2001 | Ma et al. .......................... 363/35 |
| 7,245,036 B2 * | 7/2007 | Endou et al. ................. 290/40 A |
| 7,495,410 B2 * | 2/2009 | Zargari et al. .................. 318/729 |
| 8,127,894 B2 * | 3/2012 | Agirman et al. .............. 187/290 |
| 2004/0190211 A1 | 9/2004 | Ockert et al. |

FOREIGN PATENT DOCUMENTS

| | | |
|---|---|---|
| EP | 0 044 181 A1 | 1/1982 |
| GB | 2 426 878 A | 12/2006 |
| JP | 61053511 A | 3/1986 |
| JP | 2005278224 * | 10/2005 |
| JP | 2006296114 A | 10/2006 |
| NL | 8902221 A | 4/1991 |
| RU | 1638761 A1 | 3/1991 |
| WO | 03/044939 A1 | 5/2003 |
| WO | 2007/030471 A2 | 3/2007 |
| WO | WO 2007/061419 A1 | 5/2007 |
| WO | 2007/094054 A1 | 8/2007 |

* cited by examiner

*Primary Examiner* — Rexford Barnie
*Assistant Examiner* — Toan Vu
(74) *Attorney, Agent, or Firm* — Birch, Stewart, Kolasch & Birch, LLP

(57) ABSTRACT

The invention relates to an arrangement and a method for limiting the input power of a power supply appliance (1) fitted between a power source (2) and a load (3). The arrangement according to the invention comprises a power supply appliance (1) fitted between a power source (2) and the load to be supplied (3), which power supply appliance (1) is fitted to limit its input power on the basis of the status of the aforementioned power source (2).

15 Claims, 4 Drawing Sheets

LIMITATION OF THE LOADING OF A POWER SOURCE

CROSS REFERENCE TO RELATED APPLICATIONS

Figure 1:
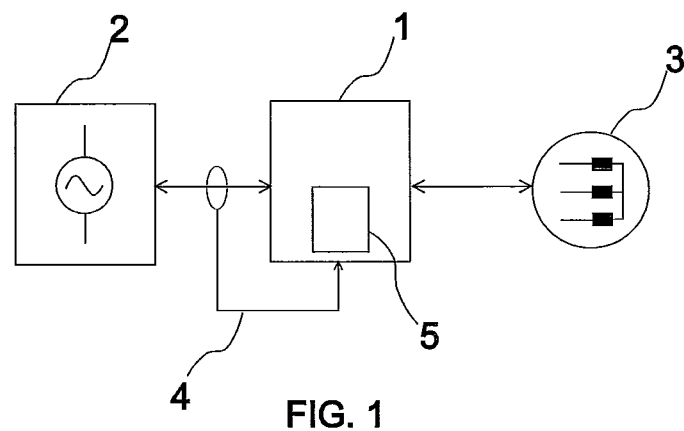

This application is a Continuation of PCT International Application No. PCT/FI2008/000127 filed on Nov. 19, 2008, which claims the benefit of Patent Application No. 20070882 filed in Finland on Nov. 12, 2007. The entire contents of all of the above applications are hereby incorporated by reference into the present application.

FIELD OF THE INVENTION

The object of the invention is an arrangement for limiting power as defined in the preamble of claim 1, an elevator system as defined in the preamble of claim 8, and a method for limiting the input power of a power supply appliance as defined in the preamble of claim 9.

PRIOR ART

Appliances connected to a power source, from luminaires to electric motors, have conventionally limited their input power automatically if overloading the power source.

Modern actively controlled power supply appliances, such as frequency converters as well as AC/DC voltage sources, load the power source according to their power requirements. These appliances do not take into account the overloading of the power source, such as a network voltage or a generator supply, as a consequence of which the operation of the power source is jeopardized.

Publication U.S. Pat. No. 5,861,734 presents an arrangement for reducing the harmonics of the current of a network voltage, in which case the loading of the network is reduced.

Publication US 2004/0190211 A1 discloses a method, a system and a control apparatus for detecting a reduction in the voltage/frequency of an electricity supply network. When detecting a reduction in the voltage/frequency, the load is disconnected from the electricity network.

PURPOSE OF THE INVENTION

The purpose of this invention is to disclose a limitation of the input power of a power supply appliance on the basis of the status of the power source. It is endeavored with the limitation of input power to prevent overloading of the power source and impairment of the operation of the power source as a consequence of this.

CHARACTERISTIC FEATURES OF THE INVENTION

The arrangement according to the invention for limiting power is characterized by what is disclosed in the characterization part of claim 1. The elevator system according to the invention is characterized by what is disclosed in the characterization part of claim 8. The method for restricting the input power of a power supply appliance according to the invention is characterized by what is disclosed in the characterization part of claim 9. Other features of the invention are characterized by what is disclosed in the other claims. Some inventive embodiments are also discussed in the descriptive section of the present application. The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts.

The arrangement according to the invention for limiting power comprises a power supply appliance fitted between the power source and the load to be supplied, which power supply appliance is fitted to limit its input power on the basis of the status of the aforementioned power source. The power source used for the electricity supply according to the invention can be for instance a voltage source or a current source supplying a direct current or an alternating current. The power supply appliance can be e.g. an AC/DC transformer, an inverter or a frequency converter supplying power to a motor. Input power refers in this context to the power taken from the power source by the power supply appliance.

In one embodiment of the invention the power supply appliance is fitted to determine the status of the power source, and also to limit its input power in stages on the basis of the determined status of the power source.

In one embodiment of the invention the power supply appliance is fitted to disconnect its power supply if the determined status of the power source so requires.

In one embodiment of the invention the power source is an alternating voltage source, and one power supply appliance according to the invention comprises in this case a determination of the status of the alternating voltage source on the basis of the supply frequency of the alternating voltage source. In this case the aforementioned power supply appliance can comprise a measurement of voltage, in which case the power supply appliance can be fitted to determine the frequency of the measured voltage e.g. using a phase-locked loop. The power supply appliance can compare the measured frequency to at least one limit value for frequency, in which case the power supply appliance can limit its input power on the basis of the aforementioned comparison of the measured frequency and the limit value for frequency. The status of the power source refers to the loading state of the power source.

One power supply appliance according to the invention comprises a determination of the status of the power source on the basis of the status signal of the power source. In this case the power source can be fitted to generate a status signal on the basis of its own status determination, and the power supply appliance can comprise an input for the status signal of the power source. A data transfer channel can be arranged between the power source and the power supply appliance for transferring the status signal from the power source to the power supply appliance. The aforementioned data transfer channel can be e.g. a wireline or wireless serial interface bus. The status signal can comprise e.g. data about the operating status of the power source, such as information about the magnitude of the output current of the power source, the supply frequency of the alternating voltage source or the magnitude of the voltage of the direct voltage source. The power source can also be fitted to determine its operational condition, and the status signal can in this case comprise data about the operational condition of the power source. The power supply appliance can be fitted to limit its input power on the basis of the status signal.

In one embodiment of the invention the power source is an alternating voltage source, and one power supply appliance according to the invention is fitted to limit its input power on the basis of a reduction of the frequency of the alternating voltage source.

In one embodiment of the invention the power source is an alternating voltage source, and one power supply appliance according to the invention is fitted to limit its input power on the basis of the frequency integral of the alternating voltage source. The frequency integral refers in this context to the integral of the deviation between the reference frequency of the supply voltage and the supply frequency of the power supply appliance.

In one embodiment of the invention the power source comprises a determination of the status of the power source, and one such power source according to the invention is fitted to send a status signal indicating the status of the power source to at least one power supply appliance.

In one embodiment of the invention the power source is an alternating voltage source, and in this case the status of the alternating voltage source is determined on the basis of the frequency of the alternating voltage source.

The elevator system according to the invention comprises an arrangement for limiting power, which arrangement comprises a power supply appliance fitted between the power supply circuit of the elevator and the power source. The aforementioned power supply appliance is fitted to limit its input power on the basis of the status of the aforementioned power source.

In one method according to the invention for limiting the input power of a power supply appliance the power supply appliance is connected to a power source; and the input power of the power supply appliance is limited on the basis of the status of the power source.

In one method according to the invention: the status of the power source is determined with the power supply appliance; and the input power of the power supply appliance is limited in stages on the basis of the determined status of the power source.

In one method according to the invention the power supply of the power supply appliance is disconnected if the determined status of the power source so requires.

In one method according to the invention the power supply appliance is connected to an alternating voltage source; and the input power of the power supply appliance is limited on the basis of the supply frequency of the alternating voltage source.

In one method according to the invention a limit value is set for the supply frequency of the alternating voltage source; and the input power of the power supply appliance is limited when the supply frequency of the alternating voltage source decreases below the aforementioned limit value for supply frequency.

In one embodiment of the invention the power supply appliance is fitted to limit its input power in stages by reducing in stages the power supplied to at least one load to be supplied.

ADVANTAGES OF THE INVENTION

With the invention at least one of the following advantages, among others, is achieved:

When the power supply appliance presented in the invention is fitted to limit its input power on the basis of the status of the power source, it is possible to prevent overloading of the power source, in which case the operating reliability of the power source improves and e.g. service breaks caused by overloading decrease.

If the power supply appliance is fitted to determine the status of the power source, the power supply appliance can be fitted to limit its input power in stages on the basis of the determined status of the power source. In this case also the power supply to the load can be continued at least in a limited manner. Continuation of the power supply at least in a limited manner is useful e.g. in different regulation processes, as well as in transport applications and control applications that require above all continuity from the power source. These kinds of applications are e.g. transport systems, such as elevator drives, travelator drives, escalator drives; as well as for instance various lighting, pumping, air-conditioning and other building automation applications, as well as fan drives. The invention is particularly well suited for use in applications in which the supply network is isolated from the national grid. These kinds of applications can be, in addition to those mentioned above, e.g. railways, metros, factories, such as pulp mills; as well as different reserve power drives, in which case the power supply occurs, e.g. during a power outage, with a generator.

When the power supply appliance is fitted to limit its input power on the basis of the supply frequency of the alternating voltage source, the overloading of the alternating voltage source, such as a network voltage or a generator, can be detected e.g. as a reduction in the supply frequency, in which case by limiting the input power of the power supply appliance it is possible to prevent oscillation of the supply frequency of the network voltage or of the generator caused by overloading.

If the power supply appliance comprises a determination of the status of the power source on the basis of the status signal of the power source, it is possible by means of the status signal of the power source to centrally control the input power of one or more power supply appliances. Since the power supply appliances do not need in this case to comprise a determination of the status of the power source, the arrangement is simplified. If the operation of determined power supply appliances incorporated in the arrangement is more important than the others, it is possible to attempt to safeguard the operation of these determined power supply appliances in a situation of overloading of the power source by limiting at first the input power of only the less important power supply appliances.

If the power supply arrangement comprises two or more power rectifiers connected to the same DC intermediate circuit, such as inverter rectifiers, for instance inverters, and if the power supply from the power source to the DC intermediate circuit occurs centrally with a network inverter rectifier fitted between the power source and the DC intermediate circuit, the network inverter rectifier can comprise a determination of the status of the power source, in which case the network inverter rectifier can limit the power taken by one or more power transformers from the DC intermediate circuit on the basis of the status of the power source.

PRESENTATION OF DRAWINGS

Figure 2:
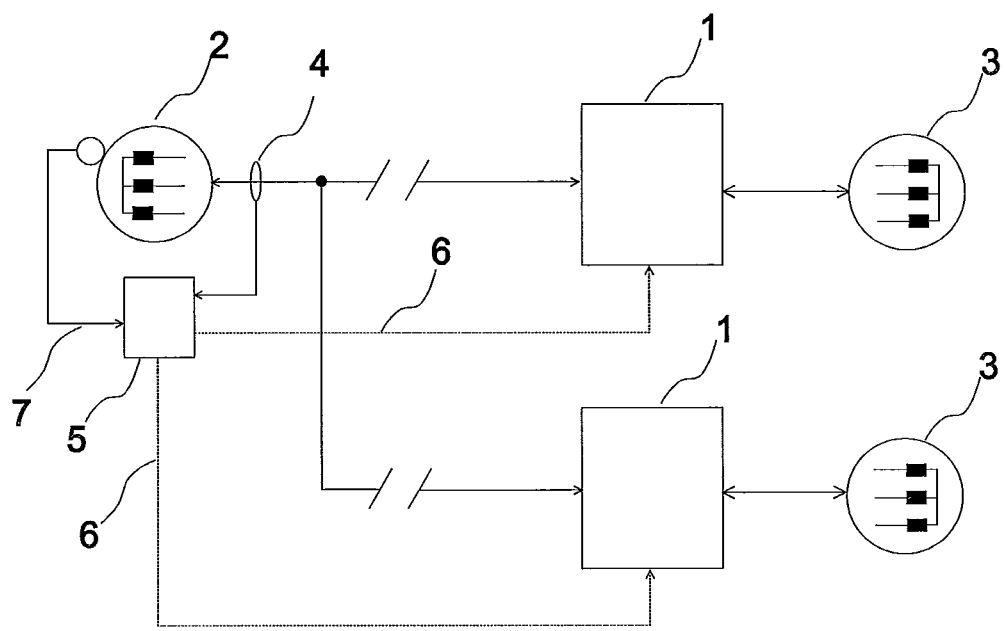
Figure 3:
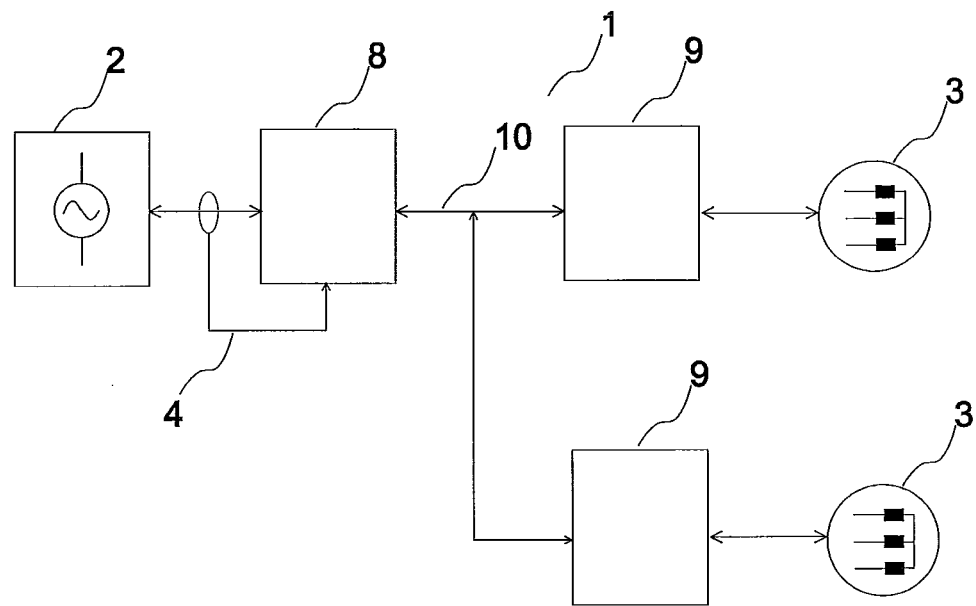
Figure 4:
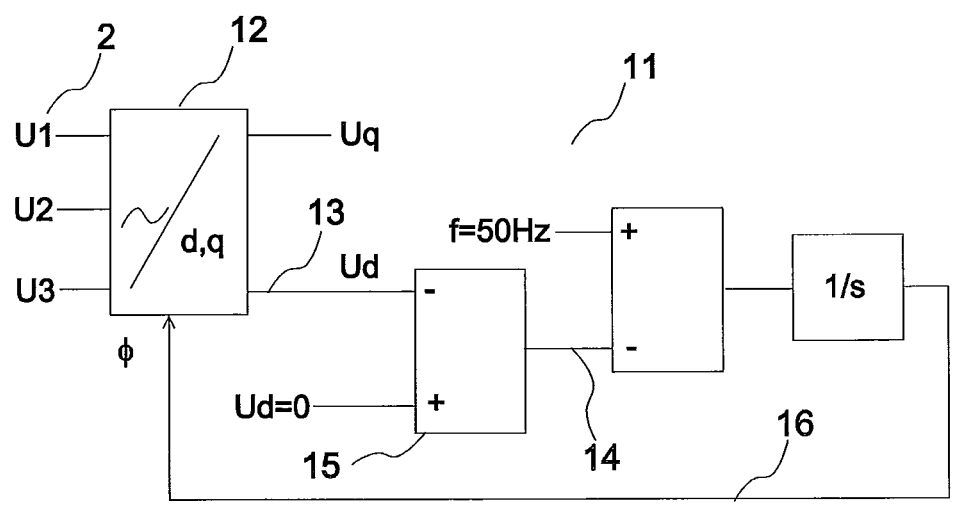
Figure 5A:
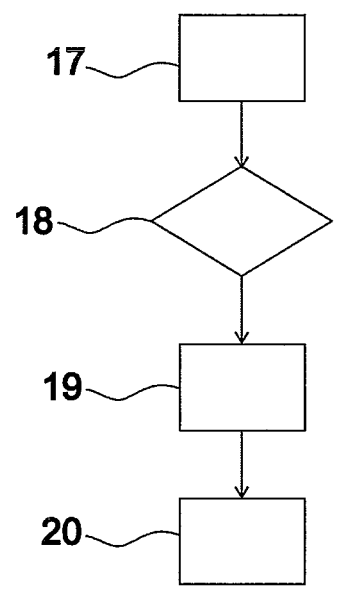
Figure 5B:
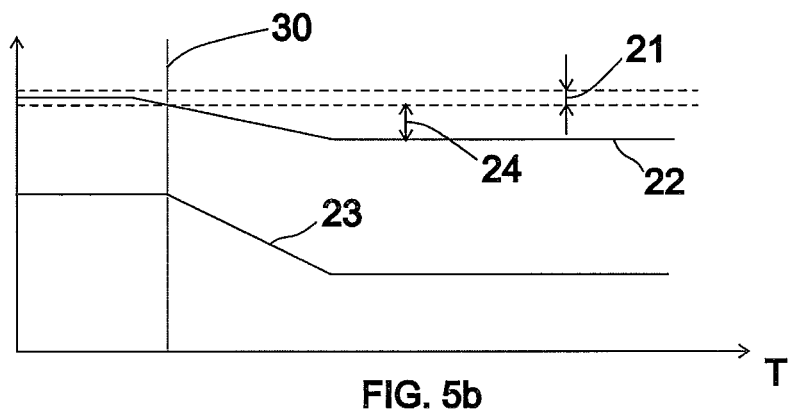
Figure 5C:
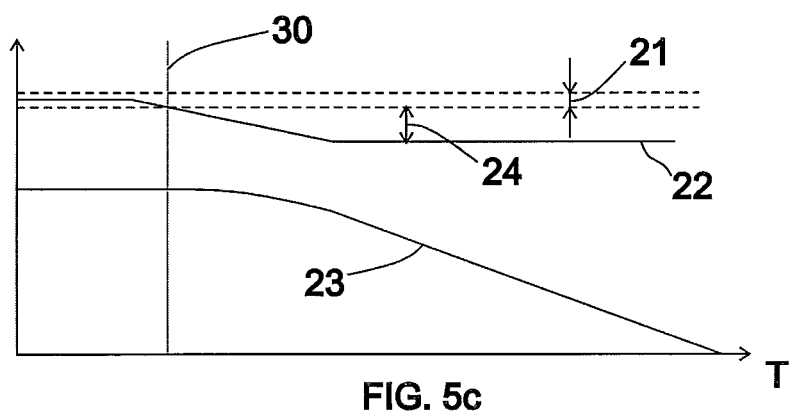
Figure 6:
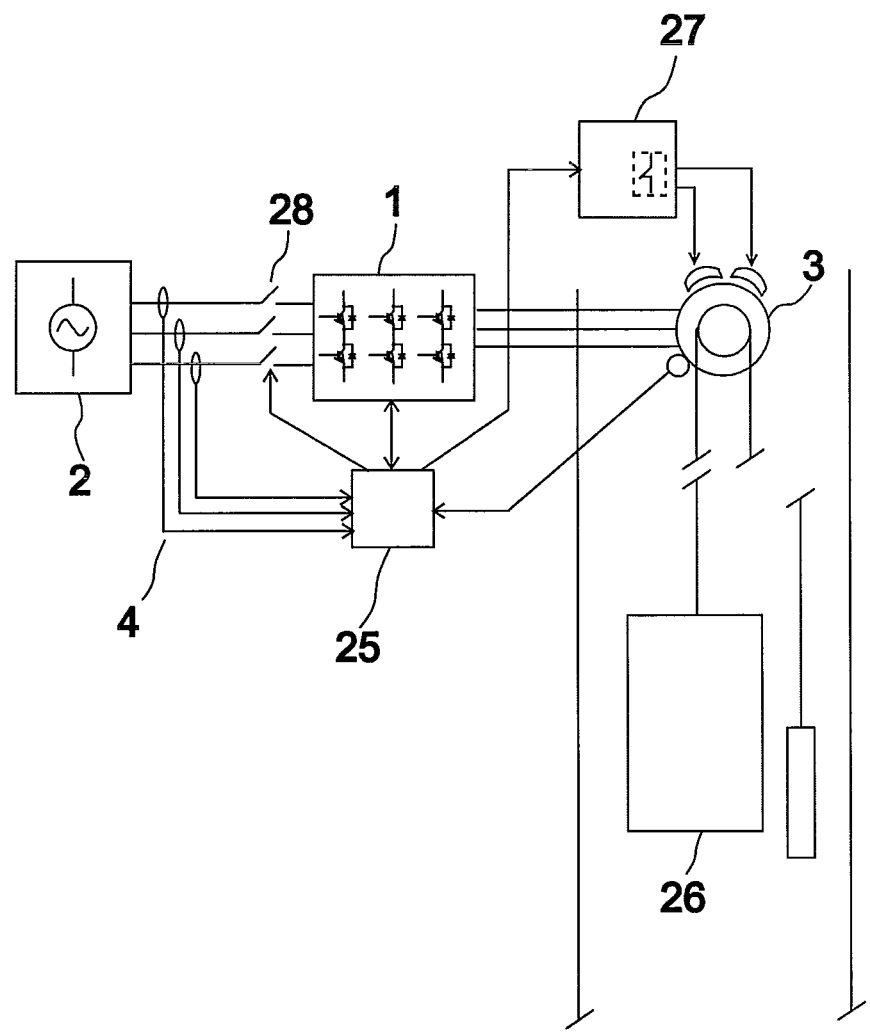

In the following, the invention will be described in more detail by the aid of a few examples of its embodiments with reference to the attached drawings, wherein FIG. 1 presents one arrangement for limiting power according to the invention FIG. 2 presents a second arrangement for limiting power according to the invention FIG. 3 presents a third arrangement for limiting power according to the invention FIG. 4 presents a determination of the input frequency of an alternating voltage source according to the invention FIG. 5 presents the limitation of power according to the invention as a block diagram FIG. 6 presents an elevator system according to the invention FIG. 1 presents an arrangement for limiting power. The arrangement comprises a frequency converter 1 fitted between an alternating voltage source 2 and an electric motor 3. In the arrangement the supply voltage of the alternating voltage source 2 is measured 4. In the arrangement the frequency converter 1 also comprises a determination 5 of the status of the alternating voltage source 2 on the basis of the measurement 4 of the supply voltage. In this case the frequency of the supply voltage is determined, and the operating status of the alternating voltage source is determined on the basis of the frequency. A decrease in the frequency indicates overloading of the alternating voltage source, so that when the frequency decreases the frequency converter 1 limits the input power.

FIG. 2 presents a second arrangement for limiting power. In this arrangement a generator 2 functions as the power source. The status of the generator is alternatively determined either by measuring the speed of rotation of the generator with a tachometer 7, or by determining the frequency of the supply voltage from the measurement 4 of the supply voltage. The generator comprises a determination 5 of status, and the generator is fitted to send the determined status signal 6 to at least two power supply appliances 1 connected to the voltage supply of the generator. The status signal comprises data about the frequency of the supply voltage of the generator, in which case the aforementioned power supply appliances 1 limit their input power on the basis of the signal indicating the frequency of the supply voltage. The status signal can also comprise a limitation command for the input power, in which case the aforementioned power supply appliances limit their input power according to the limitation command. The limitation command can also require from at least one power supply appliance 1 full disconnection of the power supply.

In the arrangement for limiting power according to FIG. 3, the arrangement comprises two inverters 9, which independently supply variable frequency and variable amplitude voltage to the windings of the motors 3. The inverters are connected to a common DC intermediate circuit 10. Power supply between the DC intermediate circuit and the network voltage 2 occurs with a network inverter rectifier 8. The network inverter rectifier 8 measures the network voltage 4, and deduces from the frequency of the network voltage the status of the network. When the frequency decreases, the network inverter rectifier 8 limits the power taken from the DC intermediate circuit by at least the second network inverter rectifier 9.

FIG. 4 presents the determination of the supply frequency of the alternating voltage source 2 using a phase-locked loop 11. The measured three-phase voltages 2 are determined in a d, q coordinate system, which is in itself prior art, fixed to the phase 16 of the network voltage. In this case the network voltage is described as two DC voltage magnitudes, Ud and Uq, locked to the phase of the network voltage. Ud=0 is made to be the control criterion of the phase-locked loop. Now it is endeavored to control the phase of the network voltage with the frequency reference 50 Hz. The comparator 15 measures the deviation 14 of the voltage Ud from zero. From this deviation 14 it is detected whether the supply voltage of the network deviates from the 50 Hz reference frequency. In this case the frequency error and at the same time the status of the network voltage is determined on the basis of the deviation 14. The determination of supply frequency according to FIG. 4 can be used e.g. in connection with the embodiment of one of FIGS. 1-4.

FIG. 5a presents a power limitation as a block diagram. FIGS. 5b and 5c are present a power limitation described as a function of time. In the phase 17 according to FIG. 5a a fluctuation range 21 is determined for the supply frequency of the alternating electricity source, within the scope of which the supply frequency remains during normal operation of the alternating electricity source. In the phase 18, the supply frequency 22 of the alternating electricity source is measured, and if the supply frequency drops below the fluctuation range 21 of normal operation, a transition to phase 19, in which the magnitude of the reduction in frequency is determined, is made, and in phase 20 the power 23 taken from the alternating electricity source by the power supply appliance is limited in stages according to the reduction in frequency, in which case the power 23 taken from the alternating electricity source by the power supply appliance is reduced as the supply frequency 22 of the alternating electricity source decreases. The power 23 taken from the alternating electricity source by the power supply appliance as presented in FIG. 5b is fitted to be reduced according to the difference 24 between the bottom limit of the fluctuation range 21 of normal operation of the supply frequency and the supply frequency 22 of the alternating electricity source. The time 30 when the input frequency 22 of the alternating electricity source drops below the bottom limit of the fluctuation range 21 of normal operation is marked in FIGS. 5b and 5c. The power 23 taken from the alternating electricity source by the power supply appliance according to FIG. 5c is fitted to be reduced according to the frequency integral of the difference 24 between the bottom limit of the fluctuation range 21 of normal operation of the supply frequency and the supply frequency 22 of the alternating electricity source. In this case if the deviation of the supply frequency 23 from the fluctuation range 21 of normal operation continues, the power 23 taken from the alternating electricity source by the power supply appliance gradually approaches zero.

FIG. 6 presents an elevator system according to the invention. The elevator car 26 is moved in the elevator shaft via elevator ropes connected to the traction sheave of the elevator motor 3. Power supply to the elevator motor occurs with a frequency converter 1 from the three-phase alternating electricity network 2 of the building. The control 25 of the movement of the elevator integrated into the frequency converter 1 sets the movement of the elevator car by regulating the electricity supply of the frequency converter. The control 25 of movement endeavors to set the movement of the elevator car according to the reference for determined movement.

The control 25 of the movement of the elevator measures the voltage of the alternating electricity network 2, and determines the frequency of the network voltage e.g. with the phase-locked loop according to the embodiment of FIG. 4. When the frequency drops to below the minimum permitted limit value for the frequency of the normal operation of the alternating electricity network 2, the control of the movement starts to limit the power supplied to the elevator motor 3 from the alternating electricity network. In this case the control 25 of movement calculates the reference for movement of the elevator car 26 again such that the reference value for the speed and/or the acceleration and/or the deceleration of the elevator car is reduced. After this the control 25 of movement endeavors to set the movement of the elevator car according to a new reference for movement determined for the lower reference value for the speed and/or the acceleration and/or the deceleration of the elevator car, in which case the power supplied to the elevator motor 3 from the alternating electricity network 2 decreases. If the decrease in the supply frequency of the alternating electricity network 2 continues further or even becomes greater, the control 25 of the movement of the elevator car in the end disconnects the main circuit of the frequency converter with the controllable switches 28, in which case the power supply to the elevator motor disconnects. At the same time the control 25 of the movement of the elevator car also closes the machinery brake by disconnecting the power supply of the brake control coils of the machinery brake with the brake control circuit 27.

The invention is not limited solely to the embodiments described above, but instead many variations are possible within the scope of the inventive concept defined by the claims below.

The invention claimed is:

1. Arrangement for limiting power from an alternating electricity power source equipped with a status determination unit that determines a status of the power source, the power source generating a status determination signal based on the determined status, the arrangement comprising:
   one or more power supply appliances fitted between the power source and a load to be supplied, the one or more power supply appliances including one or more of an AC/DC transformer, an inverter, and a frequency converter, and
   a data transfer channel arranged between the power source and a power supply appliance to transfer the status signal from the power source to the power supply appliance;
   wherein
     the generated status signal indicates a loading state of the power source and a supply frequency of the power source;
     the power supply appliance includes an input for the status signal; and
     the power supply appliance is fitted to limit input power of the power supply appliance to prevent overloading of the power source, based on a change in the supply frequency indicated by the generated status signal.

2. Arrangement according to claim 1, wherein the power supply appliance is fitted to limit the input power gradually based on the determined status of the power source.

3. Arrangement according to claim 1, where the power source is an alternating voltage source; and
   where the power supply appliance determines the status of the alternating voltage source based on a supply frequency of the alternating voltage source.

4. Arrangement according to claim 1, where the power supply appliance determines the status of the power source based on the status signal of the power source.

5. Arrangement according to claim 1, where the power source is an alternating voltage source; and
   where the power supply appliance limits the input power based on a reduction of the frequency of the alternating voltage source.

6. Arrangement according to claim 1, where the power source is an alternating voltage source; and
   where the power supply appliance limits the input power based on a frequency integral of the alternating voltage source.

7. Elevator system, operably connected to an alternating electricity power source equipped with a status determination unit that determines a status of the power source, the power source generating a status determination signal based on the determined status, the elevator system comprising:
   an arrangement for limiting power, the arrangement including
     one or more power supply appliances fitted between the power supply circuit of the elevator and the power source, the one or more power supply appliances including one or more of an AC/DC transformer, an inverter, and a frequency converter, and
     a data transfer channel arranged between the power source and a power supply appliance to transfer the status signal from the power source to the power supply appliance;
   wherein
     the generated status signal indicates a loading state of the power source and a supply frequency of the power source;
     the power supply appliance includes an input for the status signal; and
     the power supply appliance is fitted to limit input power of the power supply appliance to prevent overloading at the power source based on a change in the supply frequency indicated by the generated status signal.

8. Method for limiting input power of a power supply appliance based on a status signal generated by an alternating electricity power source, the status signal indicating a loading state of the power source and a supply frequency of the power source, the method comprising:
   providing one or more power supply appliances connected to the power source, the one or more power supply appliances including one or more of an AC/DC transformer, an inverter, and a frequency converter;
   receiving the generated status signal at an input of a power supply appliance via a data transfer channel arranged between the power source and the power supply appliance; and
   limiting the input power of the power supply appliance to prevent overloading of the power source, based on a change in the supply frequency indicated by the generated status signal.

9. Method according to claim 8, wherein
   the step of limiting the input power of the power supply appliance is performed gradually based on a determined status of the power source.

10. Method according claim 8, where the power source is an alternating voltage source; and
    where the step of limiting includes limiting the input power based on a supply frequency of the alternating voltage source.

11. Method according to claim 10, the method further comprising: setting a limit value is for the supply frequency of the alternating voltage source; and the step of limiting including limiting the input power when the supply frequency of the alternating voltage source decreases below the limit value.

12. Arrangement according to claim 2, where the power source is an alternating voltage source; and
    where the power supply appliance determines the status of the alternating voltage source based on a supply frequency of the alternating voltage source.

13. Arrangement according to claim 1, where the data transfer channel is a wireline or a wireless serial interface bus.

14. Arrangement according to claim 13, where the power source is an alternating voltage source; and
    where the power supply appliance determines the status of the alternating voltage source based on a supply frequency of the alternating voltage source.

15. Method according to claim 8, where the data transfer channel is a wireline or wireless serial interface bus.

* * * * *